UNITED STATES PATENT OFFICE.

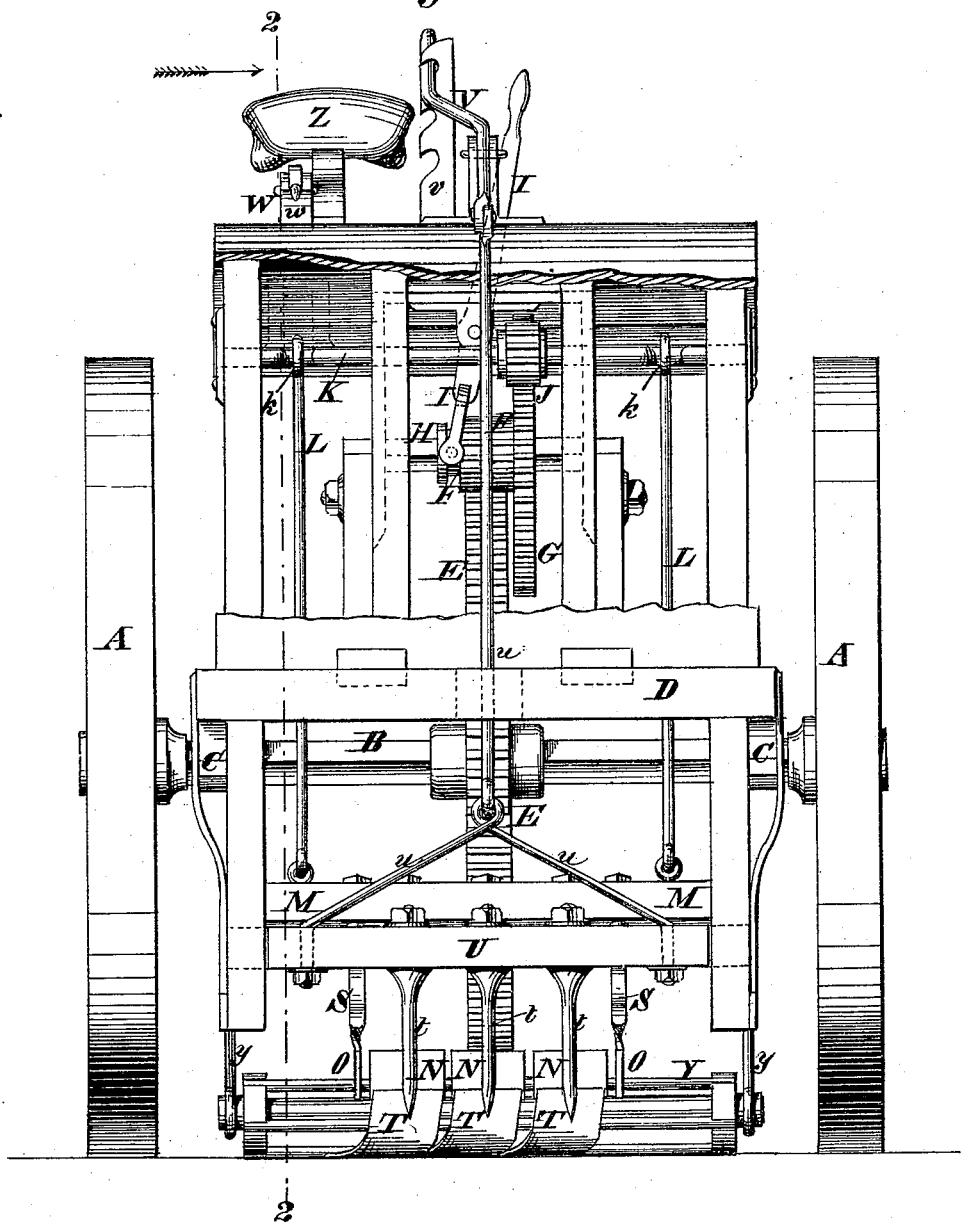

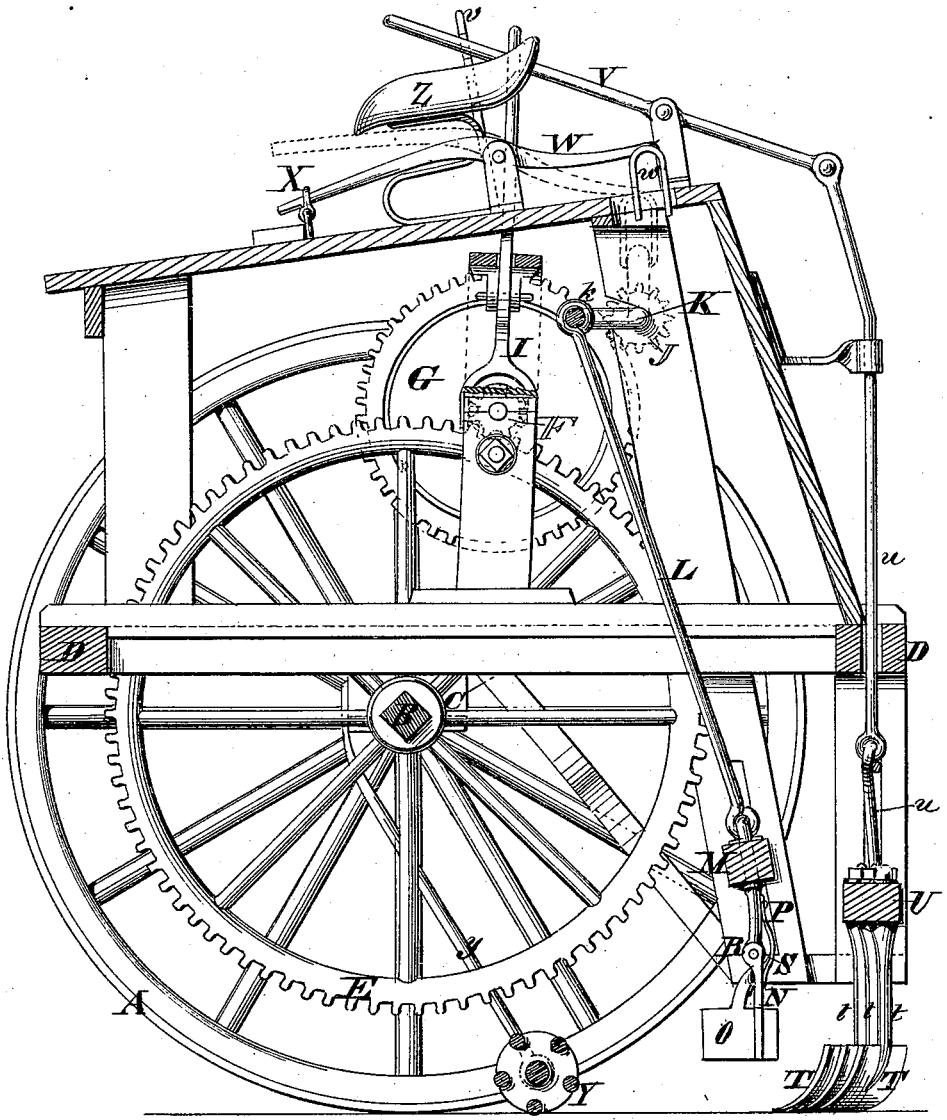

WILLIAM McCONNELL MATHES, OF CALDWELL, TEXAS, ASSIGNOR OF PART OF HIS RIGHT TO THOMAS M. HUNT AND WILLIAM PHILP, SR., OF SAME PLACE.

IMPROVEMENT IN COMBINED SPADING, PLOWING, AND STALK-CUTTING MACHINES.

Specification forming part of Letters Patent No. 181,959, dated September 5, 1876; application filed July 5, 1876.

*To all whom it may concern:*

Be it known that I, WILLIAM McC. MATHES, of Caldwell, in the county of Burleson and State of Texas, have invented a new and Improved Combined Spading, Plowing, and Stalk-Cutting Machine, of which the following is a specification:

My machine is constructed with a frame carrying a crank-shaft which is driven with increased velocity from the ground-wheels, and imparts a reciprocating movement to a cross-head, in which are mounted a series of spades, driving them obliquely into the ground, so as to loosen it. At intervals in the range of series are interposed spades or cutters, set transversely, so as to sever roots and cut the spade-slice into short lengths. The spades are adjustable in height or length, so as to vary their depth of penetration as may be required. They are followed by plows to turn the ground, also adjustable in depth by levers. The spades are attached removably and adjustably to their handles, so as to admit of ready renewal when needful, and are provided with knuckle-joints and springs, which will yield in the event of the spades striking any impenetrable obstructions, and will thus prevent breakage and readjust the spades automatically on leaving the ground.

The machine may be worked by either hand, horse, or steam power. It is adapted for spading and plowing either old or new ground, for cutting stalks, ditching, excavating, and other purposes. The gearing is disconnected so as to leave the spades at rest when the implement is moved from place to place.

When the machine is employed simply for cutting stalks, the plows may be removed, and when used as a cultivator the spades may be removed.

For operating with a very heavy team—as, for example, with several yoke of oxen, or with steam-power—two rows of spades are used on the cross-head, the machine is made of greater width and capacity, and the gearing is arranged to drive the spades with less velocity.

In the accompanying drawing, Figure 1 is a rear view of the machine with portions of the frame omitted. Fig. 2 is a vertical section on the line 2 2, Fig. 1.

A A represent a pair of ground-wheels, one or both of which are keyed or otherwise rigidly secured to an axle, B, which turns within boxes C, attached to the main frame D of the machine. The axle B carries a large gear-wheel, E, which drives a pinion, F, attached to a second gear-wheel, G. The attached pinion and gear-wheel F G are fitted to slide laterally on their shaft H, and are shifted by a clutch-lever, I, so as to throw them in or out of gear. While in gear, the pinion F meshes with the cog-wheel E, and the second cog-wheel G meshes with a second pinion, J, on a crank-shaft, K, the cranks $k$ of which carry pitmen L L, attached to a cross-head, M, in which are mounted a series of spades, N and O. The cross-head M works in guides P on the main frame, and by its reciprocating movement works the spades rapidly up and down, causing them to loosen the earth as the machine moves forward.

The longitudinal spades N loosen up slices of the ground, and the transverse spades O sever the said slices into shorter lengths, and at the same time cut any roots or other obstructions which may exist beneath the surface when the machine is used for loosening or turning the ground. Both sets of spades are also very effective in cutting stalks and other matters which may lie on the surface of the ground into short lengths, to permit them to be plowed under, so that they will offer no obstruction to cultivation.

In order to prevent the spades receiving injury in the event of striking an impenetrable body, the stocks by which they are connected to the cross-head M are provided with knuckle-joints R and springs S. The knuckle-joints permit the spade-stocks to bend under excessive pressure, and the springs restore them to their normal position when the pressure is removed.

T T T are a series of plow mold-boards, attached by stocks or standards $t$ to a cross-beam, U, which is adjustable in height by a hanger, $u$, and lever V, held by a rack, $v$, so as to suspend the range of plows at any desirable height to keep them out of contact with the ground when the implement is being conveyed from place to place, or to limit their penetration when in use.

W represents a locking-lever, provided with a forked end, $w$, which drops over one of the cranks $k$ of the shaft K, (see dotted lines in Fig. 2,) so as to retain the cranks, and, consequently, the cross-beam M and spades N O, in their most elevated position, when it is desired to keep them out of use either for the purpose of conveying the implement from place to place, or for using the plows T alone. When the spades are thus locked, the connected pinion and gear F G are thrown out of mesh with the cog-wheel E and pinion J, respectively, by means of the lever I.

X represents a hook or catch, to retain the lever W in its retracted position while the spades are in operation. Y represents a roller, drawn by rods or chains $y$, and employed to break down stalks in advance of the spades N O, so as to permit the said spades to cut them to pieces. Z represents the driver's seat.

Having thus described my invention, the following is what I claim as new therein and desire to secure by Letters Patent:

1. A series of spades arranged in a plane parallel with the axis of the machine, and interposed spades in planes at right angles thereto, all attached to a reciprocating cross-bar and operating as herein set forth.

2. The combination of the range of spades N O and the range of plows T, operating to loosen and turn the ground in the manner substantially as herein described.

3. The combination, with the spades N O, of the knuckle-joints R and springs S, constructed and applied as specified, to permit the spades to bend backward on striking an impenetrable body, and regain their operative position.

4. The combination of the skeleton-roller Y, spades N, and plows F, as and for the purpose set forth.

5. The combination of the clutch-wheel or pinion F, for throwing the spades in and out of gear, and the lock W $w$, for securing the crank-shaft $k$ so as to retain the spades in their elevated position.

WILLIAM McCONNELL MATHES.

Witnesses:
  OCTAVIUS KNIGHT,
  A. H. GALT.